US009820327B2

(12) United States Patent
Bergius et al.

(10) Patent No.: US 9,820,327 B2
(45) Date of Patent: Nov. 14, 2017

(54) RE-ATTACHING TO THE NETWORK AFTER RECEPTION OF A SERVICE REJECT AT A USER EQUIPMENT IN RESPONSE TO A SERVICE REQUEST

(71) Applicant: Nokia Technologies Oy, Espoo (FI)

(72) Inventors: Hannu Bergius, Kangasala (FI); Jussi-Pekka Koskinen, Oulu (FI); Jarkko Tuomo Koskela, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/433,259

(22) PCT Filed: Oct. 15, 2012

(86) PCT No.: PCT/US2012/060289
§ 371 (c)(1),
(2) Date: Apr. 2, 2015

(87) PCT Pub. No.: WO2014/062156
PCT Pub. Date: Apr. 24, 2015

(65) Prior Publication Data
US 2015/0282241 A1  Oct. 1, 2015

(51) Int. Cl.
*H04W 76/02* (2009.01)
*H04W 76/04* (2009.01)
*H04W 76/06* (2009.01)

(52) U.S. Cl.
CPC ....... *H04W 76/027* (2013.01); *H04W 76/046* (2013.01); *H04W 76/068* (2013.01)

(58) Field of Classification Search
CPC ............ H04W 76/027; H04W 76/046; H04W 76/068; H04W 48/06; H04W 60/00;
(Continued)

(56) References Cited

U.S. PATENT DOCUMENTS

| 8,548,469 | B1* | 10/2013 | Hietalahti | H04W 76/027 |
| | | | | 370/328 |
| 2006/0089137 | A1* | 4/2006 | Howell | H04W 76/027 |
| | | | | 455/423 |

(Continued)

OTHER PUBLICATIONS

Nokia, "Solving Excessive TAU Delay", Aug. 2012, 3GPP TST CT WG1 Meeting #79, C1-122987, 12 pages.*
(Continued)

*Primary Examiner* — Edan Orgad
*Assistant Examiner* — Ivan O Latorre
(74) *Attorney, Agent, or Firm* — Mintz Levin Cohn Ferris Glovsky and Popeo, P.C.

(57) ABSTRACT

Methods and apparatus, including computer program products, are provided for delaying a service request. In one aspect there is provided a method. The method may include receiving, at a user equipment, a message including a service rejection sent by a network; starting a timeout period in response to the received message including the service rejection; and waiting to send an attach request to the network until at least one of a radio resource control connection release is received from the network or the timeout period expires. Related apparatus, systems, methods, and articles are also described.

15 Claims, 7 Drawing Sheets

(58) Field of Classification Search
CPC ... H04W 48/08; H04W 74/00; H04W 76/041; H04W 76/028; H04W 36/165; H04W 60/04; H04L 47/10
USPC ....... 370/329, 230, 221, 328, 331, 242, 259; 455/435.1, 423, 550.1, 510
See application file for complete search history.

(56) References Cited

U.S. PATENT DOCUMENTS

| | | | | |
|---|---|---|---|---|
| 2010/0302950 | A1* | 12/2010 | Zhao | H04L 47/10 370/242 |
| 2011/0171926 | A1* | 7/2011 | Faccin | H04W 48/18 455/404.1 |
| 2011/0199898 | A1* | 8/2011 | Cho | H04W 48/06 370/230 |
| 2012/0002545 | A1* | 1/2012 | Watfa | H04W 48/06 370/235 |
| 2012/0076121 | A1* | 3/2012 | Choi | H04W 76/062 370/338 |
| 2012/0113982 | A1* | 5/2012 | Akselin | H04L 12/66 370/355 |
| 2012/0178449 | A1* | 7/2012 | Liao | H04W 60/00 455/435.2 |
| 2012/0178457 | A1* | 7/2012 | Liao | H04W 76/027 455/437 |
| 2012/0182912 | A1* | 7/2012 | Watfa | H04W 36/0022 370/311 |
| 2012/0314562 | A1* | 12/2012 | Zhao | H04W 76/02 370/216 |
| 2012/0315874 | A1* | 12/2012 | Li | H04L 65/102 455/411 |
| 2013/0012204 | A1* | 1/2013 | Kim | H04W 60/06 455/435.1 |
| 2013/0034080 | A1* | 2/2013 | Yang | H04W 36/0055 370/331 |
| 2013/0039244 | A1* | 2/2013 | Sun | H04W 52/0235 370/311 |
| 2013/0039339 | A1* | 2/2013 | Rayavarapu | H04W 76/028 370/331 |
| 2013/0115917 | A1* | 5/2013 | Tanaka | H04W 76/027 455/411 |
| 2013/0189973 | A1* | 7/2013 | Chang | H04W 76/046 455/423 |
| 2013/0308527 | A1* | 11/2013 | Chin | H04W 36/0022 370/328 |
| 2014/0024371 | A1* | 1/2014 | Lair | H04W 48/08 455/435.1 |
| 2014/0078890 | A1* | 3/2014 | Lu | H04W 24/04 370/221 |
| 2014/0078892 | A1* | 3/2014 | Cave | H04W 76/028 370/228 |

OTHER PUBLICATIONS

3GPP TS 24.301 V11.4.0, 3rd Generation Partnership Project; Technical Specification Group Core Network and Terminals; Non-Access-Stratum (NAS) protocol for Evolved Packet System (EPS); Stage 3 (Release 11), Sep. 2012, 341 Pages.*
International Search Report and Written Opinion received for corresponding Patent Cooperation Treaty Application No. PCT/US2012/060289, dated Jul. 11, 2013, 15 pages.
NEC et al., "3GPP TSG CT WG1 Meting #71; C1-111700; Handling of re-attach following TAU reject or Service Request reject", 3vol CT WG1, No. Tallinn, May 9, 2011, May 2, 2011, pp. 1-6, XP00481112, [retrieved on May 2, 2011].
LG Electronics Inc., "3GPP TSG Geran #51; GP-111209; Discussion on CN overload control in Geran" vol. TSG No. Gothenburg; Aug. 29, 2011, Aug. 25, 2011 (Aug. 25, 2011), pp. 1-3, XP050536853, [retrieved on Aug. 25, 2011].

* cited by examiner

FIG. 7

RE-ATTACHING TO THE NETWORK AFTER RECEPTION OF A SERVICE REJECT AT A USER EQUIPMENT IN RESPONSE TO A SERVICE REQUEST

RELATED APPLICATION

This application was originally filed as Patent Cooperation Treaty Application No. PCT/US2012/060289 filed Oct. 15, 2012.

FIELD

The subject matter disclosed herein relates to wireless communications.

BACKGROUND

The Long Term Evolution (LTE) series of standards defines an Evolved Packet System (EPS) mobility management (EMM) sublayer to support user equipment mobility. EMM also provides connection management services to the session management sublayer and the short message services entity of the connection management sublayer. EMM connection management procedures include the service request, the paging procedure, and the like. EMM procedures are typically performed when a non-access stratum (NAS) signaling connection has been established between the user equipment and the network; otherwise, the EMM may initiate establishment of a NAS signaling connection.

The EMM's service request procedure is typically invoked when one or more of the following occur: the network has downlink signaling pending; the user equipment has uplink signaling pending; the user equipment or the network has user data pending and the user equipment is in an idle mode (for example, EMM-IDLE); the user equipment, in an idle mode (for example, EMM-IDLE) or connected mode (for example, EMM-CONNECTED), has requested to perform a mobile originating/terminating circuit switch (CS) fallback or 1xCS fallback; the network has downlink cdma2000® signaling pending; or the user equipment has uplink cdma2000® signaling pending. Moreover, the service request procedure may be initiated by the user equipment for the downlink transfer of signaling, CDMA 2000 signaling, or user data in EMM-IDLE mode, in which case the network may trigger the user equipment via a paging procedure.

If a service request is not accepted by the network, the network may send a service reject message to the user equipment. Moreover, a node in the network, such as a mobility management entity (MME), may define a reason for rejecting the service request from the user equipment. For example, if a service request from a user equipment cannot be accepted, the network may return a service reject message to the user equipment, and the service reject message may include a cause code for the rejection.

SUMMARY

Methods and apparatus, including computer program products, are provided for delaying service requests. In one aspect there is provided a method. The method may include receiving, at a user equipment, a message including a service rejection sent by a network; starting a timeout period in response to the received message including the service rejection; and waiting to send an attach request to the network until at least one of a radio resource control connection release is received from the network or the timeout period expires.

In some example embodiments, one of more variations may be made as well as described in the detailed description below and/or as described in the following features. The waiting to send the attach request may prevent a race condition between the attach request and the radio resource control connection release. The attach request to the network may be sent after the waiting. The user equipment may autonomously initiate a release of a radio resource control connection between the user equipment and the network and establish, before the sending, another radio resource control connection for carrying the attach request, when the timeout period expires without the radio resource control connection release being received at the user equipment. The user equipment may send the attach request to the radio resource control connection and the network, when the timeout period expires without the radio resource control connection release being received at the user equipment, the radio resource control connection may be established before the receiving of the message including the service rejection. The message may comprise a service rejection message including a first indication representative of a user equipment identity that is not derived and a second indication representative of the user equipment being implicitly detached. The message may comprise a service rejection message including at least one of a cause 9 and a cause 10.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

In some example embodiments, the subject matter disclosed herein may address the avoidance, if not elimination of, some of the substantial delays occurring after a service reject is received at a user equipment and a subsequent attach request procedure is initiated. Specifically, there may be a substantial delay after a network node, such as the MME, a base station, and the like, sends a service reject to a user equipment, and the service reject includes certain causes for the rejections, such as cause 9 and/or cause 10. Cause 9 indicates that the user equipment's identity cannot be derived by the network. For example, the network cannot derive the user equipment's identity from the globally unique temporary identifier (GUTI), the system architecture evolution temporary mobile subscriber identity (S-TMSI), packet temporary mobile subscriber identity (P-TMSI), routing area identifier (RAI), and/or any other identifier (for example, no matching identity and/or context in the network or a failure to validate the user equipment's identity due to an integrity check failure for the received message). Cause 10 defines that the user equipment is implicitly detached. For example, if the network has implicitly detached the user equipment (for example, after the implicit detach timer has expired) or the EMM context data related to the subscription does not exist in the MME (for example, because of a MME restart), the network sends a service reject message including cause 10.

The above-noted substantial delay may correspond to certain implementation options available to the MME and/or user equipment after a service reject message is sent to a user equipment initiating an attachment request. Table 1 below depicts two example situations (labeled Substantial Delay 1 and Substantial Delay 2) in which the substantial delays may occur. The first substantial delay (labeled Substantial Delay 1) may occur after the service reject message is sent to, and received by, the user equipment and the following two conditions exist: (1) the MME sends a context release message to the base station (for example, an evolved Node B (eNB)), which forwards a connection release message to the user equipment to enable the release of an existing radio resource control (RRC) connection; and (2) the user equipment is configured to use an existing (for example, old) RRC signaling connection, when the attach request is initiated after the service reject message is received. Due to lags in the system, a race condition may thus be created between the time the MME sends the service reject message and the time the user equipment receives the RRC connection release. In some example implementations, this substantial delay may cause a 10-second delay in establishing a new connection between the user equipment and the network (for example, after a NAS-layer re-attach timer, T3411, starts and a second, subsequent attach request message after the service reject is sent to the network). The second substantial delay (labeled Substantial Delay 2) may occur after the service reject message is sent to, and received by, the user equipment and the following two conditions exist: (1) the MME does not sends a release message to the base station, so a connection release message is not received by the user equipment to enable the release of an existing radio resource control (RRC) connection; and (2) the user equipment uses a new RRC signaling connection for attach request initiated after the service reject message. This second substantial delay may also cause about a 10-second delay.

TABLE 1

| | MME sends to user equipment a context release (for example, an RRC connection release sent to user equipment) | MME does not send to user equipment a context release (for example, an RRC connection release not sent to user equipment) |
| --- | --- | --- |
| User equipment NAS-layer uses old RRC Signaling Connection for Attach Request | Substantial Delay 1 Attach Request may clash with RRC Connection Release causing excessive delay. | No substantial delay as in Substantial Delays 1 and 2 |
| User equipment NAS-layer uses new RRC Signaling Connection for Attach Request | No substantial delay as in Substantial Delays 1 and 2 | Substantial Delay 2 User equipment may need to wait until eNB releases RRC connection before sending a new Attach Request. |

In some example embodiments, the user equipment may be configured to initiate the start of a predetermined timer, when the service rejection message including the cause 9 and/or 10 are received from the network. If after the user equipment receives the service reject message the predetermined timer has not expired and the network has released the radio resource control (RRC) connection between the user equipment and the network, the user equipment may then initiate the establishment of another (for example, also referred to as "new") RRC signaling connection to the network, when attempting to attach to the network. However, if the predetermined timer has expired after the service reject message and the network has not released the old radio resource control (RRC) connection between the user equipment and the network, the user equipment may instead use the old RRC signaling connection to the network and/or may autonomously release the old RRC connection to the network, in which case establishment of a new RRC connection is initiated to enable the attach request after the service rejection (for example, through 3GPP TS 36.331, Chapter 5.3.9, "RRC connection release requested by upper layers" or through any other procedure).

In some example embodiments, the predetermined timer may be configured to provide sufficient time for the MME to signal an intent to require use of the old, existing RRC signaling connection for the attach request after the service rejection. For example, the predetermined timer may be configured to have a duration sufficient to avoid the so-called "clash" between the attach request and the RRC connection release noted with respect to Substantial Delay 1 and long enough to allow the MME to signal the intent to require use of the old, existing RRC signaling connection. In some example embodiments, the predetermined timer is set at about 200 milliseconds, although higher and lower values may be used as well. The predetermined timer may be configured by the user equipment, configured by the network, and/or specified by a specification.

Before providing additional examples, the following provides an example of a system framework in which some of the example embodiments described herein may be implemented.

Figure 1:
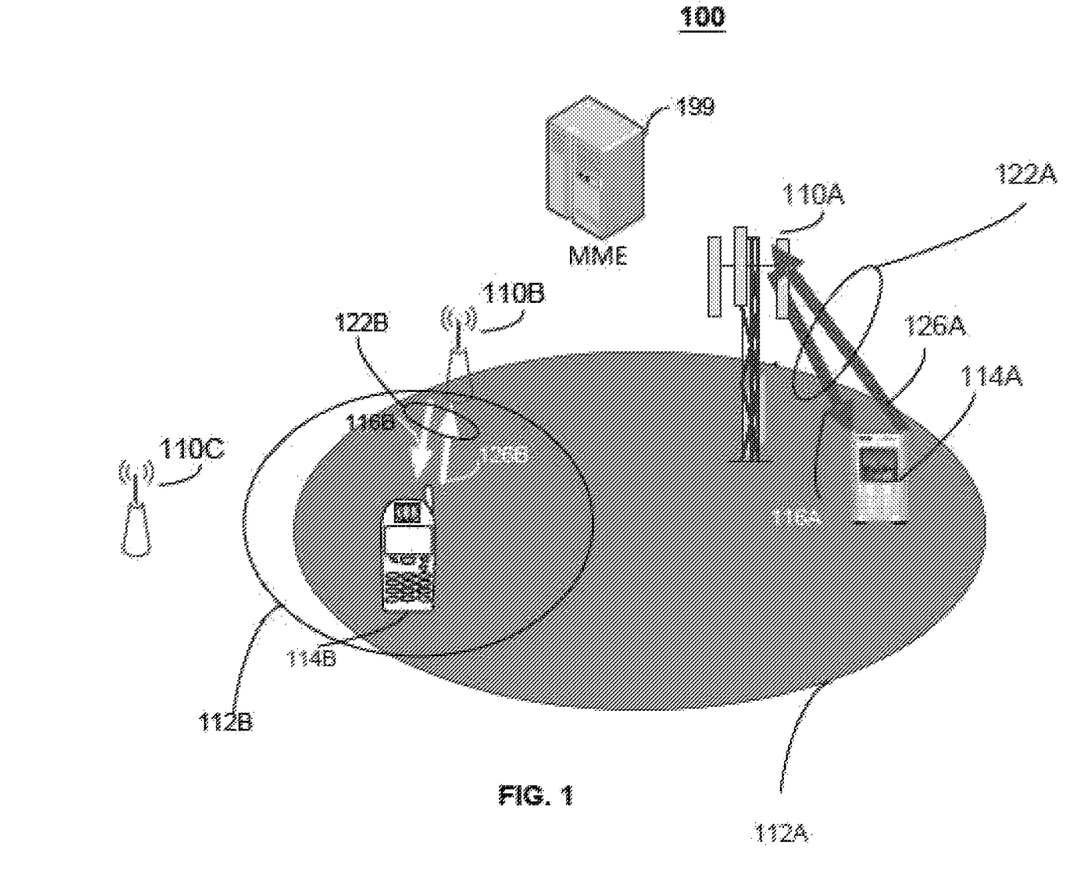
FIG. 1 depicts an example system in which a timer may be used after a service reject to determine whether to use a new or an old radio resource control connection for an attach request, in accordance with some example embodiments.

FIG. 1 depicts a system 100 according to some example embodiments. System 100 may include one or more user equipment, such as user equipment 114A-B, one or more access points, such as base stations 110A-C. In some example embodiments, base station 110A may serve a cell, such as macrocell 112A, and base stations 110A-B may serve a small cell, such as a picocell or a femtocell 112B, although base station 110B may serve other types of cells as well. Moreover, base stations may have wired and/or wireless backhaul links to other network nodes, such as a mobility management entity (MME) 199, other base stations, a radio network controller, a core network, a serving gateway, and the like. MME may comprise at least one processor and at least one memory including code which when executed by the at least one process causes the MME to provide one or more of the operations described herein with respect to the MME.

In some example embodiments, user equipment 114A-B may be implemented as a user equipment and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some example embodiments, the user equipment may include one or more processors, one or more computer-readable storage medium (for example, memory, storage, and the like), one or more radio access components (for example, a modem, a transceiver, and the like), and/or a user interface. The computer readable medium may include code which when executed by a processor provides one or more applications.

In some example embodiments, the user equipment 114A-B may be implemented as multi-mode user devices configured to operate using a plurality of radio access technologies, although a single-mode device may be used as well. For example, user equipment 114A-B may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. Moreover, the user equipment 114A-B may be configured to have established connections to access points using a plurality of the radio access technologies.

The base stations 110A-C may, in some example embodiments, be implemented as an evolved Node B (eNB) type base station, although other types of radio access points may be implemented as well. When the evolved Node B (eNB) type base station is used, the base stations, such as base stations 110A-B, may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell.

In some example embodiments, system 100 may include access links, such as links 122A-B. The access links 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, location information, and the like, to the user equipment 114A, and the uplink 126A may comprise a modulated radio frequency carrying information, such as user data, RRC messages, location information, measurement reports associated with handovers, and the like, from the user equipment 114A to base station 110A. Access links 122B may include downlink 116B for transmitting from the base station 110B to user equipment 114B, and uplink 126B for transmitting from user equipment 114B to the base station 110B.

Although FIG. 1 depicts access links between certain user equipment and certain base stations, the user equipment and base stations may have additional links to other devices as well.

The downlink 116A and uplinks 126A may, in some example embodiments, each represent a radio frequency (RF) signal. The RF signal may, as noted above, carry data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use different standards or technologies as well, such as WiFi, WiBro, BT-LE, and/or another other wireless technology. In addition, each access link may be unidirectional or bidirectional.

Although FIG. 1 depicts a specific quantity and configuration of base stations, cells, and user equipment, other quantities and configurations may be implemented as well.

Figure 2:
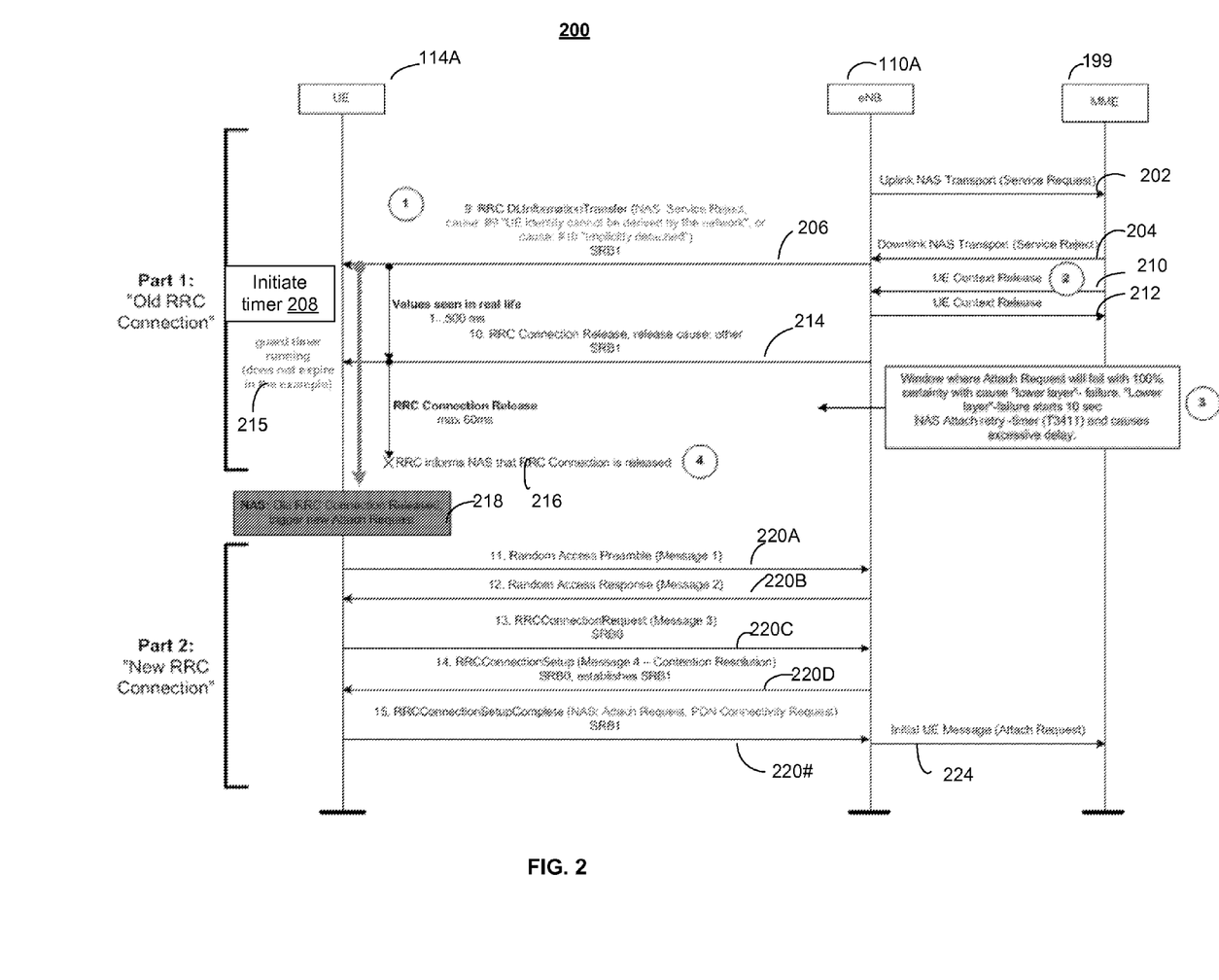
FIGS. 2-5 depict examples of processes in which a timer may be used after a service reject to determine whether to use a new or an old radio resource control connection for an attach request, in accordance with some example embodiments.

FIG. 2 depicts a process 200, in accordance with some example embodiments. The description of process 200 also refers to FIG. 1.

As noted above, the user equipment 114A may, in some example embodiments, be configured to initiate the start of a predetermined timer, when a service rejection message (also referred to as a service reject message) including cause 9 and/or cause 10 is received from the network. If after receipt of the service rejection message, the predetermined timer has not expired and the network has released the radio resource control (RRC) connection between the user equipment and the network, the user equipment may then initiate the establishment of another, new RRC signaling connection to the network, when attempting to attach to the network.

At 202, the base station 110A (labeled eNB) may, in some example embodiments, send to MME 199 a service request message. In this example embodiment, MME 199 may reject the service request by sending a service reject 204 to base station 110A. Next, the base station 110A may send, at 206, to user equipment 114A a service reject message via a first RRC connection (also referred to as the "old RRC connection") carried by downlink 116A, in accordance with some example embodiments. The service reject message may include information representative of a cause, such as cause 9 (for example, the user equipment identity cannot be derived by the network) or cause 10 (for example, the user equipment is implicitly detached).

When the service reject message is received by the user equipment 114A, the user equipment 114A may, in some example embodiments, start a predetermined timer (labeled guard timer and timer) at 208.

At 210, the MME 199 may, in some example embodiments, release the user equipment context, which is acknowledged at 212 by the base station 110A. At 214, the base station 110A may then send, in some example embodiments, an RRC connection release to the user equipment 114A, where the predetermined timer has not expired at 215. In some example embodiments, the user equipment 114A may notify the NAS layer at the user equipment of the RRC connection release of the first RRC connection.

In some example embodiments, the user equipment 114A (or the NAS layer therein) may release at 218 the first RRC connection, which may trigger a new attach request to be sent to the network and the initiation of a second, new RRC signaling connection to the network, such as base station 110A.

At 220A-E, the user equipment 114A may, in some example embodiments, initiate the establishment of the second RRC signaling connection by sending, at 220A, a random access preamble message to the base station 110A (which may respond at 220B with a random access response), sending, at 220C, an RRC connection request message to the base station 110A (which may respond at 220D with an RRC connection setup message), and by sending, at 220E, an RRC connection setup complete message including an attach request to the base station 110A to indicate that the second RRC connection establishment is complete. In some example embodiments, the base station 110A may send, at 224, the user equipment 114A's attach request to the MME 199.

Figure 3:
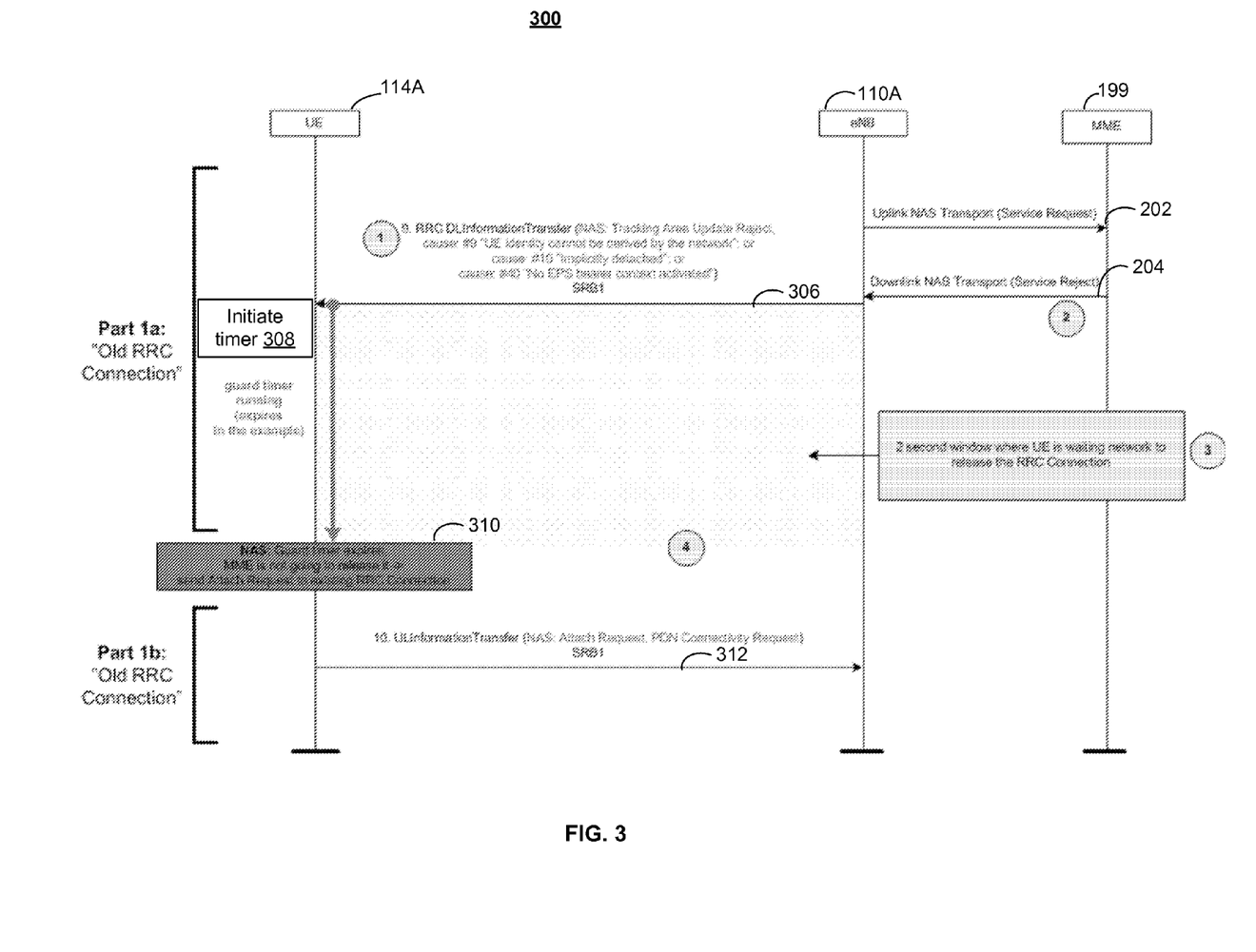

FIG. 3 depicts a process 300, in accordance with some example embodiments. The description of process 300 also refers to FIGS. 1 and 2.

In some example embodiments, process 300 may be implemented after the service reject message is received at 206 at process 200, when the predetermined timer has expired and the MME has not released the old radio resource control (RRC) connection between the user equipment and the network. When this is the case, the user equipment 114A may use the old RRC signaling connection to the network for the attach request, rather than use a new RRC signaling connection as described above with respect to process 200.

At 202, the base station 110A (labeled eNB) may, in some example embodiments, send to MME 199 a service request message. In this example embodiment, MME 199 may reject the service request by sending a service reject 204 to base station 110A.

In some example embodiments, the base station 110A may send, at 306, to user equipment 114A a service reject message via a first RRC connection (also referred to as the "old RRC connection") carried by downlink 116A. The service reject message may include information representative of a cause, such as cause 9, cause 10, or cause 40 (for example, no EPS bearer context activated).

When the service reject message is received by the user equipment, the user equipment may start at 308 a predetermined timer (labeled guard timer and timer). Unlike process 200, the predetermined timer expires at 310 while the user equipment 114A waits for an indication from the network regarding the release of the first RRC connection. In this example embodiment, the predetermined timer has expired and the MME has not released the old, first radio resource control (RRC) connection between the user equipment and the network, so the user equipment may send, at 312, the attach request via the old, first RRC connection. In some example embodiments, the user equipment may thus select, based on the timer, between the old RRC connection or a new RRC connection in order to send an attachment request after a service reject is received including cause 9, cause 10, and/or cause 40.

Figure 4:
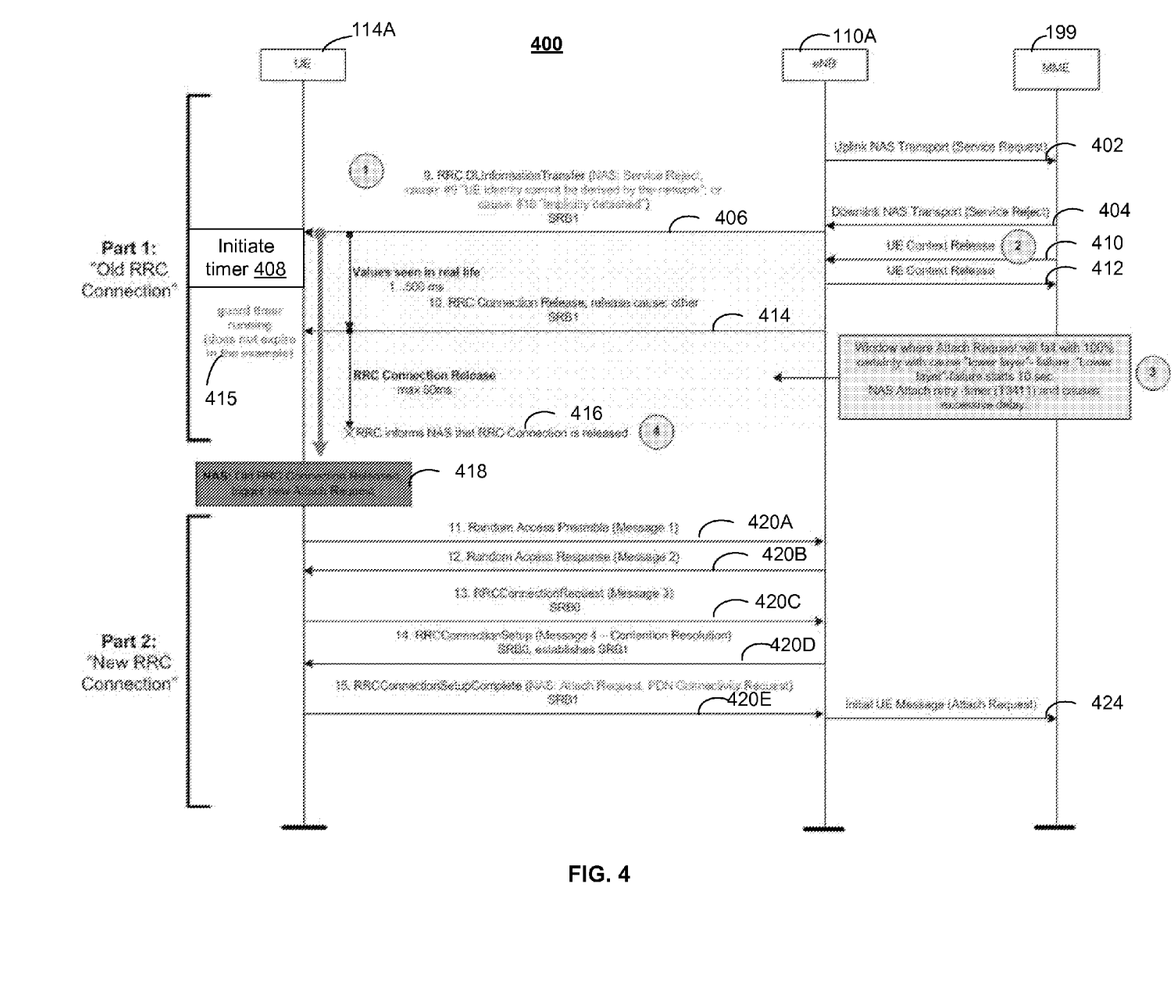

FIG. 4 depicts a process 200, in accordance with some example embodiments. The description of process 400 also refers to FIG. 1.

At 402, the base station 110A (labeled eNB) may, in some example embodiments, send to MME 199 a service request message. In this example embodiment, MME 199 may reject the service request by sending a service reject 404 to base station 110A. Next, the base station 110A may send, at 406, to user equipment 114A a service reject message via a first RRC connection (also referred to as the "old RRC connection") carried by downlink 116A, in accordance with some example embodiments. The service reject message may include information representative of a cause, such as cause 9 or cause 10. When the service reject message is received by the user equipment 114A, the user equipment 114A may, in some example embodiments, start a predetermined timer (labeled guard timer and timer) at 408. At 410, the MME 199 may, in some example embodiments, release the user equipment context, which is acknowledged at 412 by the base station 110A. At 414, the base station 110A may then send, in some example embodiments, an RRC connection release to the user equipment 114A, where the predetermined timer has not expired at 415. The user equipment 114A may, in some example embodiments, notify the NAS layer at the user equipment of the RRC connection release of the first RRC connection. In some example embodiments, the user equipment 114A (or the NAS layer therein) may release at 418 the first RRC connection, which may trigger sending an attach request to the network and initiating a second, new RRC signaling connection to the network, such as base station 110A. At 420A-E, the user equipment 114A may, in some example embodiments, initiate the establishment of the second RRC signaling connection as depicted by 420A-E. In some example embodiments, the base station 110A may send, at 424, the user equipment 114A's attach request to the MME 199.

Figure 5:
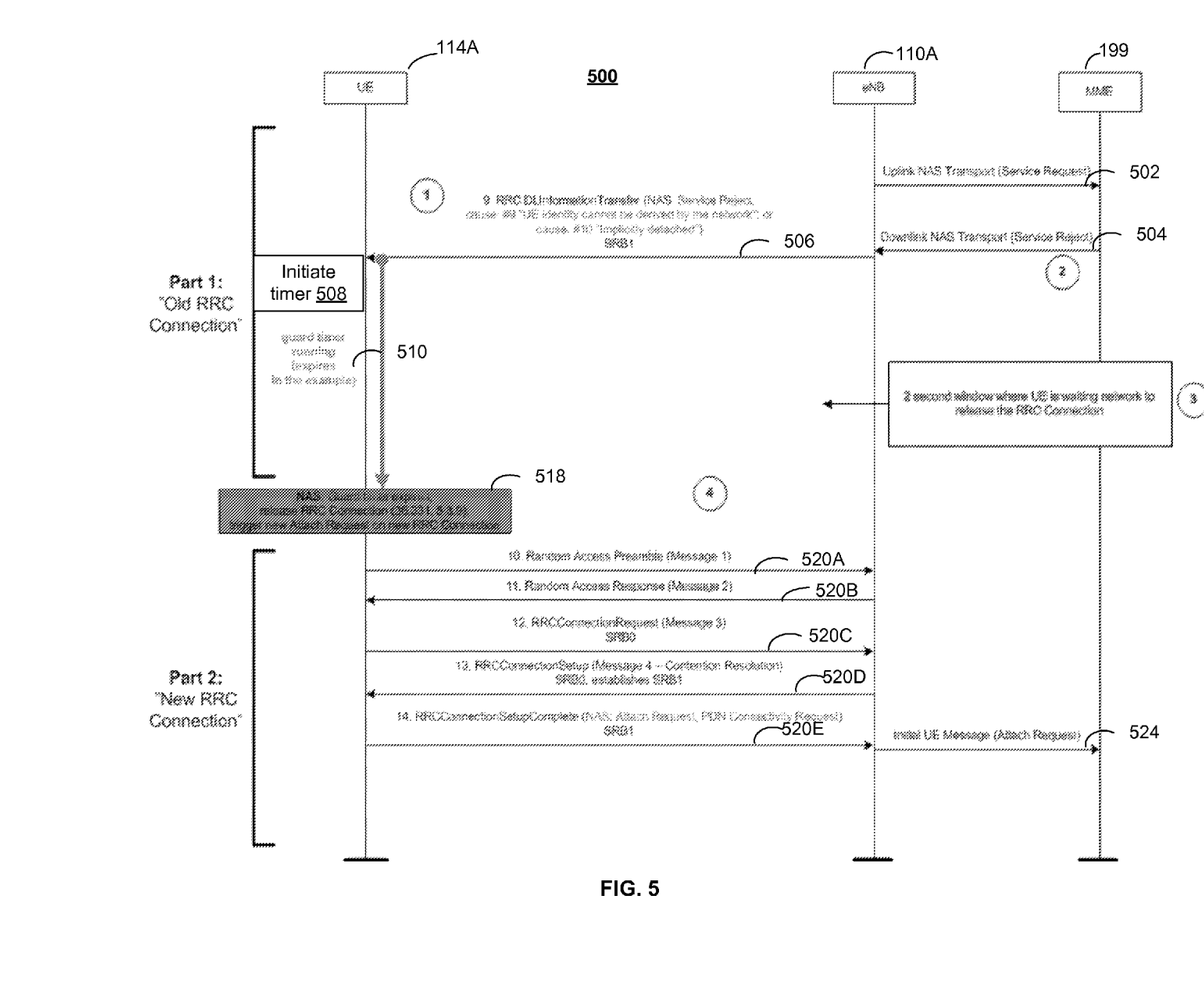

FIG. 5 depicts a process 500, in accordance with some example embodiments. The description of process 500 also refers to FIGS. 1 and 4.

In some example embodiments, process 500 may be implemented after the service reject is received at 406 of process 400 and the predetermined timer has expired without the MME releasing the old radio resource control (RRC) connection between the user equipment and the network. When this is the case, the user equipment may autonomously (for example, without being signaled by the network) release the first (for example, old) RRC signaling connection to the network and use the first RRC signaling connection for sending the attach request.

At 502, the base station 110A may send to MME 199 a service request message, in accordance with some example embodiments. In this example embodiment, MME 199 may reject the service request by sending a service reject 504 to base station 110A. Next, the base station 110A may send, at 506, to user equipment 114A a service reject message via a first RRC connection (also referred to as the "old RRC connection") carried by downlink 116A, in accordance with some example embodiments. The service reject message may include information representative of a cause, such as cause 9 or cause 10. When the service reject message is received by the user equipment 114A, the user equipment 114A may, in some example embodiments, start at 508 a predetermined timer (labeled guard timer or time). However, the predetermined timer expires at 510 while the user equipment 114A waits for the MME 199 to provide an indication regarding the release of the first/old RRC connection. The user equipment 114A may, in some example embodiments, autonomously release, at 518, the first/old RRC connection and trigger a new attach request on a second (for example, new) RRC connection. Messages 520A-520E represent the signaling associated with the establishment of the new RRC connection, and when the setup is complete, the base station 110A may send, at 524, the attach request message to the MME 199. In some example embodiments, the user equipment may thus select, based on the timer, between the old RRC connection or a new RRC connection in order to send an attachment request after a service reject including certain causes.

In some example embodiments, the user equipment 114A may not start the predetermined timer or delay sending of the attach request (as well as other NAS messages), when the RRC connection release process is ongoing. This may be implemented by having the RRC signaling indicate to the NAS layer at the user equipment that RRC connection release is ongoing. During this time, the NAS layer may not initiate an attach request process but instead may wait for a time (for example, a fixed time that can be specified in a standard and/or configured by the user equipment) or wait for the RRC signaling to indicate to the NAS layer that the connection is released. For example, the NAS layer may be configured to not initialize the attach request after the indication is received that the RRC connection process is ongoing (for example, initialization of attach may be done at a timer expiry or after indication from RRC that release procedure is complete).

Furthermore, in some example embodiments, if the RRC signaling receives an attach request or any other NAS message during RRC connection release procedure, RRC signaling may delay sending the attach request message until the RRC connection is released at the new RRC connection establishment is initiated.

In some example embodiments, signaling radio bearer 2 (SRB2) messages may be buffered while waiting for a new connection to be established (after the old RRC connection is released), and then the SRB2 buffer information may be forwarded over the newly established connection to network. This buffering may be done at PDCP based on the indication by RRC.

In some example embodiments, the user equipment may not delay handling of an RRC connection release for about 60 milliseconds and thus cause a new RRC connection establishment for the attach request.

In some example embodiments, the network may not release the RRC connection after service reject with cause #9 and #10, so the user equipment (or NAS-layer therein) may use the old RRC signaling connection for the attach request.

Figure 6:
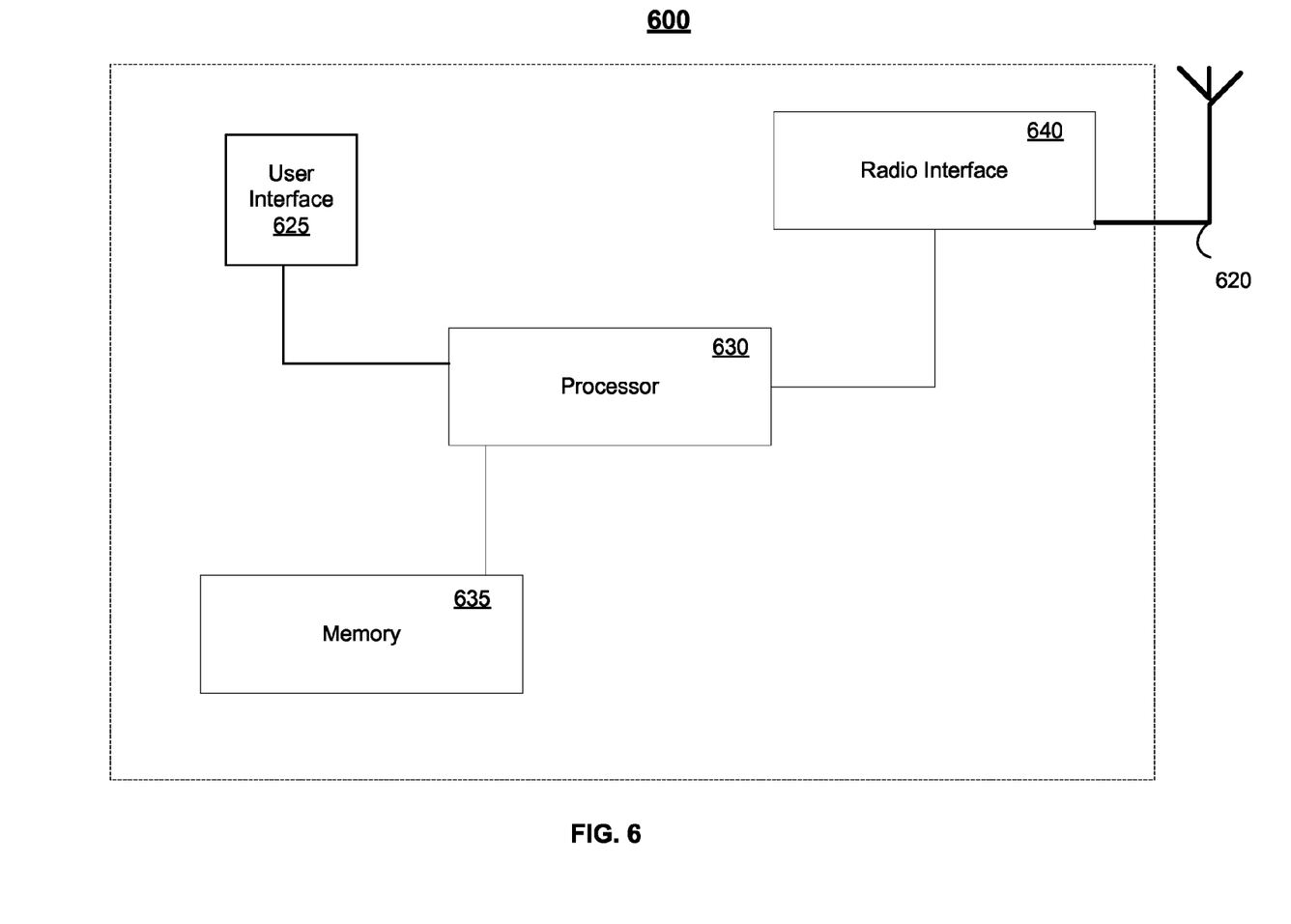
FIG. 6 depicts an example of a radio, in accordance with some example embodiments.

FIG. 6 depicts a block diagram of a radio, such as a user equipment 500. The user equipment 600 may include an antenna 620 for receiving a downlink and transmitting via an uplink. The user equipment 600 may also include a radio interface 640 (also referred to as a modem) coupled to the antenna 620. The radio interface 640 may correspond to a plurality of radio access technologies including one or more of LTE, WLAN, Bluetooth, BT-LE, NFC, RFID, UWB, ZigBee, and the like. The radio interface 640 may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. The user equipment 600 may further include a user interface 625, at least one processor, such as processor 630, for controlling user equipment 600 and for accessing and executing program code stored in memory 635. In some example embodiments, the memory 635 includes code, which when executed by at least one processor causes one or more of the operations described herein with respect to user equipment, such as process 200, process 300, process 400, process 500, and the like. For example, the user equipment may select between the establishment of an old and new RRC connection, monitor predetermined timers, generate messages, establish timers, monitor timers, send the generated messages to the network, and/or perform any other operations associated with the user equipment disclosed herein.

Figure 7:
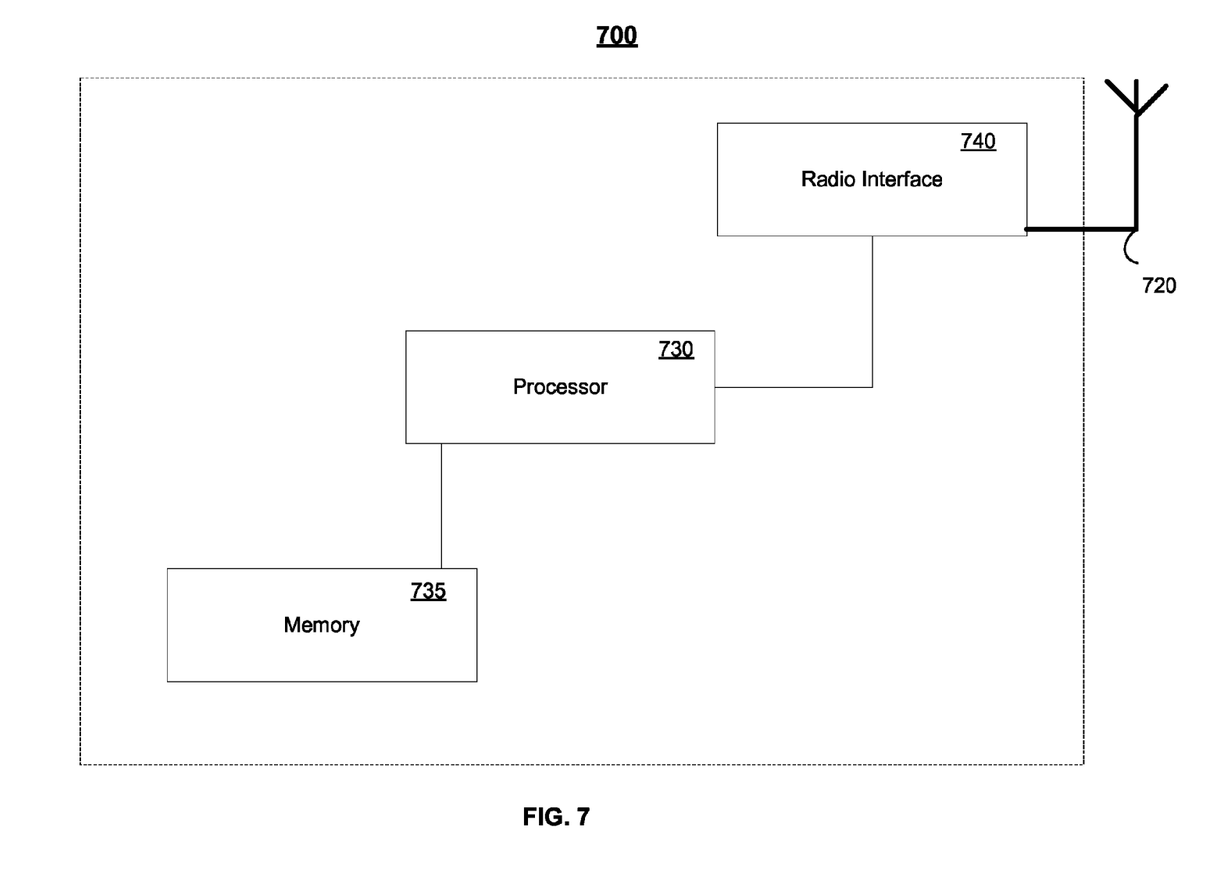
FIG. 7 depicts an example of an access point, in accordance with some example embodiments.

FIG. 7 depicts an example implementation of an access point 700, which may be implemented at devices 110A or 110B. The access point may include one or more antennas 720 configured to transmit via a downlink and configured to receive uplinks via the antenna(s) 720. The access point may further include a plurality of radio interfaces 740 coupled to the antenna 720. The radio interfaces may correspond to a plurality of radio access technologies including one or more of LTE, WLAN, Bluetooth, BT-LE, NFC, radio frequency identifier (RFID), ultrawideband (UWB), ZigBee, and the like. The access point may further include one or more processors, such as processor 730, for controlling the access point 700 and for accessing and executing program code stored in memory 735. In some example embodiments, the memory 735 includes code, which when executed by at least one processor causes one or more of the operations described herein with respect to an access point. The radio interface 740 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). Furthermore, the access point 700 may be configured to establish connections to the user equipment, implement a connection setup including RRC connection establishment and/or reestablishment process, generate messages, send the generated messages to the user equipment and/or MME, and/or perform any other operations associated with the access point (for example, base station) disclosed herein.

Without in any way limiting the scope, interpretation, or application of the claims appearing herein, a technical effect of one or more of the example embodiments disclosed herein may, in some example implementations, comprise reducing, if not eliminating, the substantial delay noted herein after a service request is rejected by the network, although other technical effects may be realized as well.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   receiving, at a user equipment, a message including a service rejection sent by a network, the service rejection being responsive to a request from the user equipment to establish a non-access stratum signaling connection with the network, and the service rejection including one of a first indication representative of the network being unable to derive a user equipment identity and a second indication representative of the user equipment being implicitly detached;
   starting, in response to the received message including the service rejection, a timeout period;
   waiting to send an attach request to the network until at least one of a radio resource control connection release is received from the network or the timeout period expires;
   in response to an expiration of the timeout period, sending the attach request via an existing radio resource control connection; and
   in response to receiving the radio resource control connection release prior to the expiration of the timeout period, sending the attach request via another radio resource control connection.

2. The method of claim 1, wherein the waiting to send the attach request prevents a race condition between the attach request and the radio resource control connection release.

3. The method of claim 1, wherein the user equipment autonomously initiates a release of the existing radio resource control connection between the user equipment and the network and establishes, before the sending, the other radio resource control connection for carrying the attach request.

4. The method of claim 1, wherein the sending further comprises:
   in response to the expiration of the timeout period, sending, by the user equipment, the attach request to the existing radio resource control connection and the network, the existing radio resource control connection being established before the receiving of the message including the service rejection.

5. The method of claim 1, wherein the service rejection indicates at least one of a cause 9 and a cause 10, wherein the cause 9 indicates that the network is unable to derive an identity of the user equipment, and wherein the cause 10 indicates that the network implicitly detached the user equipment.

6. The method of claim 1, wherein the radio resource control connection release comprises an indication from the network releasing the existing radio resource control connection.

7. An apparatus comprising:
   at least one processor; and
   at least one memory including computer program code for one or more programs, the at least one processor, the at least one memory, and the computer program code configured to cause the apparatus to at least:
   receive a message including a service rejection sent by a network, the service rejection being responsive to a request from the apparatus to establish a non-access stratum signaling connection with the network, and the service rejection including one of a first indication representative of the network being unable to derive a user equipment identity and a second indication representative of the user equipment being implicitly detached;
   start, in response to the received message including the service rejection, a timeout period;
   wait to send an attach request to the network until at least one of a radio resource control connection release is received from the network or the timeout period expires;
   in response to an expiration of the timeout period, send the attach request via an existing radio resource control connection; and
   in response to receiving the radio resource control connection release prior to the expiration of the timeout period, send the attach request via another radio resource control connection.

8. The apparatus of claim 7, wherein the wait to send the attach request prevents a race condition between the attach request and the radio resource control connection release.

9. The apparatus of claim 7, wherein the apparatus is further configured to at least:
initiate a release of the existing radio resource control connection between the apparatus and the network; and
establish, before the attach request is sent, the other radio resource control connection for carrying the attach request.

10. The apparatus of claim 7, wherein the apparatus is further configured to at least:
in response to the expiration of the timeout period, send the attach request to the existing radio resource control connection and the network, the existing radio resource control connection being established before the message including the service rejection is received.

11. The apparatus of claim 7, wherein the service rejection indicates at least one of a cause 9 and a cause 10, wherein the cause 9 indicates that the network is unable to derive an identity of the user equipment, and wherein the cause 10 indicates that the network implicitly detached the user equipment.

12. A non-transitory computer-readable medium encoded with instructions that, when executed by a processor, perform at least the following:
receiving, at a user equipment, a message including a service rejection sent by a network, the service rejection being responsive to a request from the user equipment to establish a non-access stratum signaling connection with the network, and the service rejection including one of a first indication representative of the network being unable to derive a user equipment identity and a second indication representative of the user equipment being implicitly detached;
starting, in response to the received message including the service rejection, a timeout period;
waiting to send an attach request to the network until at least one of a radio resource control connection release is received from the network or the timeout period expires;
in response to an expiration of the timeout period, sending the attach request via an existing radio resource control connection; and
in response to receiving the radio resource control connection release prior to the expiration of the timeout period, sending the attach request via another radio resource control connection.

13. The computer-readable medium of claim 12, wherein the waiting to send the attach request prevents a race condition between the attach request and the radio resource control connection release.

14. The computer-readable medium of claim 12, wherein the user equipment autonomously initiates a release of the existing radio resource control connection between the user equipment and the network and establishes, before the sending, the other radio resource control connection for carrying the attach request.

15. The computer-readable medium of claim 12, wherein the sending further comprises:
in response to the expiration of the timeout period, sending, by the user equipment, the attach request to the existing radio resource control connection and the network, the existing radio resource control connection being established before the receiving of the message including the service rejection.

* * * * *